Figure 1:
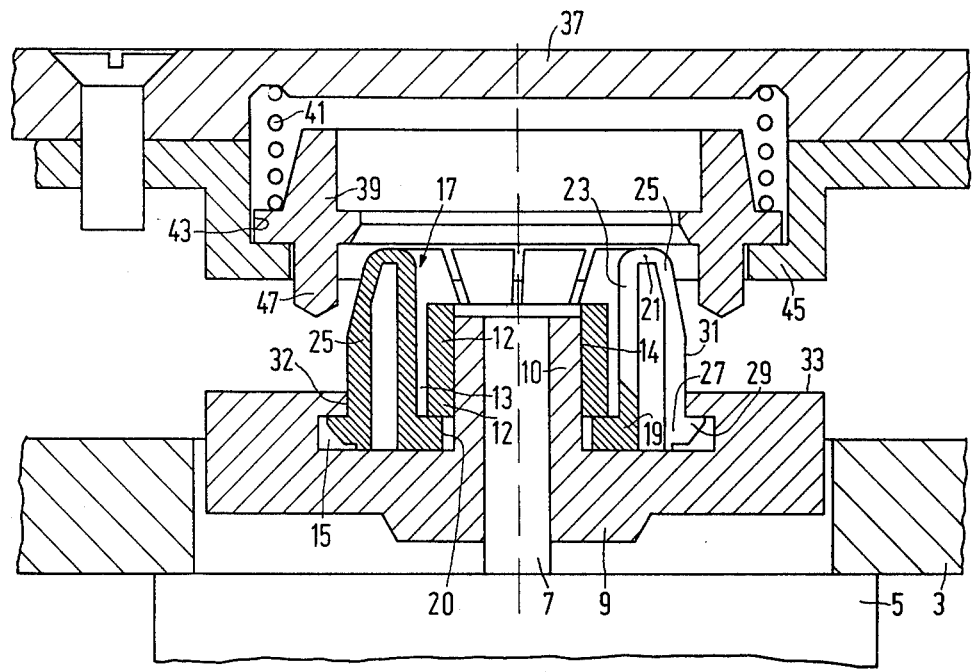

United States Patent [19]

Eisemann

[11] Patent Number: 4,484,321
[45] Date of Patent: Nov. 20, 1984

[54] DISC PLAYER FOR A RIGID INFORMATION-CARRYING DISC

[76] Inventor: Kurt Eisemann, Moltkestrasse 36, 1000 Berlin 45, Fed. Rep. of Germany

[21] Appl. No.: 479,307

[22] Filed: Mar. 28, 1983

[30] Foreign Application Priority Data

Mar. 27, 1982 [DE] Fed. Rep. of Germany ....... 3211361

[51] Int. Cl.³ .......................... G11B 3/70; G11B 5/82
[52] U.S. Cl. .................................................. 369/270
[58] Field of Search ................... 369/270, 271, 77.1, 369/77.2, 75.1

[56] References Cited

U.S. PATENT DOCUMENTS

| | | | |
|---|---|---|---|
| 4,158,867 | 6/1979 | Tops et al. | 369/79 |
| 4,166,622 | 9/1979 | Rager | 369/270 |
| 4,358,843 | 11/1982 | Rager | 369/270 |
| 4,420,830 | 12/1983 | Green | 369/270 |

*Primary Examiner*—Steven L. Stephan
*Attorney, Agent, or Firm*—Robert S. Smith

[57] ABSTRACT

The invention relates to a disc player for a rigid information-carrying disc (11) which rotates on a turntable during information transfer. The disc player has a turntable (9) and a centering device (17) which comprises a plurality of U-shaped members (21) arranged along a circle, the inner limbs (23) being connected to a base ring (19) and the outer limbs being radially movable in an annular recess (13) of the turntable (9). The base ring (19) is provided with a collar (20) which surrounds a flanged sleeve (10) with clearance and whose position is fixed by means of a clamping sleeve which is pressed onto the flanged sleeve.

3 Claims, 2 Drawing Figures

DISC PLAYER FOR A RIGID INFORMATION-CARRYING DISC

The invention relates to a disc player for a rigid information-carrying disc which during the information transfer rotates about the axis of rotation of a turntable, which player has a centering device which comprises a plurality of centering elements which are arranged along a circle, which are connected to a common basering, and which are each resilient in a radial direction so that the centering elements, which act on the center hole of the disc, keep the disc in a centered position relative to the axis of rotation during its rotation, which player further comprises a lid which as it is closed urges the disc resiliently onto the centering device and the turntable by means of a disc loader.

Such a disc player for a rigid information-carrying disc is known from German Offenelgungsschrift No. 29 21 410. This disc player comprises a disc loader provided with a magnetic ring which is mounted on the lid of the disc player by means of a spring. When the lid is closed this permanent-magnetic ring acts on the disc as a result of the spring and the magnetic attraction relative to the turntable. During playing of the disc the magnetic ring of the disc loader bears on the disc and thereby retains it.

In disc players for playing rigid information-carrying discs containing digital information it is important that the information-carrying disc is centered accurately on the turntable. The known devices cannot be injection-moulded from a plastics with such an accuracy that all the radial resilient elements exert the same spring force.

It is the object of the invention to provide a disc player for a rigid information-carrying disc, in which the information-carrying disc is not only kept in a stable position on the turntable but is also centered in an optimum manner.

According to the invention thus is achieved in that the centering elements comprise U-shaped members which extend radially outwards from the base ring, their inner limbs being connected to the base ring and projections on the outer limbs engaging an annular recess in the turntable so that the limbs are radially movable in said recess, the base ring is formed with a collar which surrounds a flanged sleeve with clearance, which flanged sleeve is connected to the turntable, the position of the base ring being fixed by a clamping sleeve which has been slid onto the flanged sleeve so that the collar is clamped between the clamping sleeve and the turntable, in the absence of an information-carrying disc, the outer limbs spring outwards against a stop ring which is provided on the turntable and which is concentric with the axis of rotation, and the inner wall of the center hole in the information-carrying disc has a diameter which is smaller than that of the stop ring.

In this way the pressure exerted on the information-carrying disc by the centering elements acts in an accurately radial outward direction and the disc is centered accurately on the turntable. The centering device may be injection-moulded, tolerances as regards the elasticity of the limbs being compensated for by an automatic adjustment of the base ring to a center position.

Figure 2:
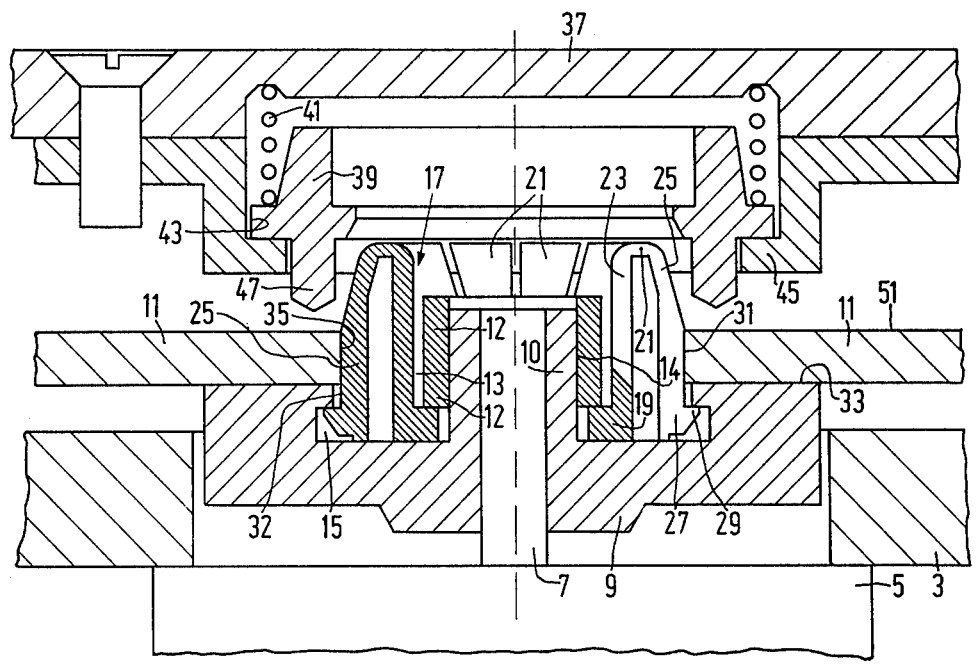

An embodiment of the invention will now be described in more detail, by way of example, with reference to the drawings. In the drawings:

FIG. 1 is a sectional view of a part of a disc player for a rigid information-carrying disc in accordance with the invention, the lid being in a slightly lifted position relative to the turntable, and FIG. 2 is a sectional view of the record player shown in FIG. 1 after the information-carrying disc has been placed on and urged against the turntable, the lid then being slightly clear of the information-carrying disc.

The chassis of a disc player 3 shown in FIG. 1 carries a drive motor 5. A drive spindle 7 which projects from the motor 5 carries a turntable 9 for a rigid information-carrying disc 11 (see FIG. 2). In the center of the turntable 9 a central flanged sleeve 10 is arranged, onto which a clamping sleeve 12 is pressed. An annular recess 13 in the turntable 9 surrounds the sleeve 10, which recess has an undercut portion 15 which extends radially outwards relative to the spindle 7.

A centering device 17 which can be placed in the turntable 9 comprises a base ring 19 having an inwardly projecting collar 20. Around the base ring 19 U-shaped plastics members 21 are arranged, which members constitute centering elements, are arranged along a circle and extend radially outwards. Preferably, the members 21 and the ring 19 are integrally injection-moulded. The inner limbs 23 of the members 21 are connected to the base ring 19 and the outer limbs 25 are resiliently movable in a radially outward direction. The free ends 27 of the outer limbs 25 have projections 29 which engage the groove 15 in the turntable 9, the upper walls of the projections 29 and the base ring 19 being disposed substantially in line with each other. The clamping sleeve 12 is pressed on an inwardly directed collar 20 of the base ring 19, which surrounds the sleeve 10 with clearance.

It is important that the centering device 17 centers an information-carrying disc 11 on the turntable 9 accurately relative to the axis of rotation 7a. An accurate centering means that all members 21 of the centering device 17 must have the same elasticity. However, in practice this is not the case. Tolerances during injection-moulding lead to different elasticities. This disadvantage shoud be overcome without having to increase the accuracy of the injection-moulding process. To this end the centering device is placed on the turntable 9 when the clamping sleeve is not yet present. The projections 29 of the base ring 19 then engage the undercut 15. The outer walls 31 of the outer limbs 25 are urged resiliently against a stop ring 32 of the recess 13, which ring is accurately concentric with the axis of rotation 7a, so that said limbs are centered accurately. The base ring 15 is then still freely movable. When an information-carrying disc 11 is placed on the turntable 9 (FIG. 2), the base ring 19 automatically assumes a center position when the resilient forces of the various members 21 compensate for each other, which center position need not be centered accurately relative to the drive spindle but corresponds to the spring-compensated center of the centering device. The wall 35 of the center hole of the information-carrying disc 11 urges all the limbs radially inwards until the resilient forces of all the members 21 are compensated for. As a result of this compensation the base ring 19 is automatically moved to the spring-compensated center. After this automatic centering of the base ring 19 the clamping sleeve 12 is pressed onto the flanged sleeve 10 and clamps the base ring 19 in place. The spring-compensated center of the centering device 17 is now fixed, so that the device is ready for use.

A lid 37 of the disc player 3 carries an axially movable disc loader 39. A helical spring 41 acts on a collar 43 of the disc loader 39, which is thereby urged towards the turntable 9 against a stop 45 on the lid 37. The disc loader 39 comprises a ring 47 which extends towards the turntable 9. For playing back an information-carrying disc 11 this disc is placed onto the centering device with its center hole. If the lid 37 is now pressed downwards during a first stage of a closing movement the disc loader 39 urges the information-carrying disc 11 onto the centering device 17 and onto the turntable 9. The inner wall 35 of the center hole, which hole has a diameter which is smaller than that of the stop ring 32 on the turntable 19, urges the outer limbs of the various U-shaped members 21 inwards against the initial tension of the U-shaped members (FIG. 2). This results in such a contact pressure along the inner wall of the hole of the information-carrying disc 11 and the outer walls 31 of the limbs 25 that the information-carrying disc is retained on the turntable 9. The spring-compensated U-shaped members 21 then automatically center the information-carrying disc relative to the axis of rotation 7a in the correct position for playing.

During a second stage of the closing movement the lid 37 is slightly lifted by spring means, not shown. The ring 47 is then clear of the upper surface 51 of the information-carrying disc 11 and during the playing process which now starts the disc 11 is only in contact with the centering device 17 and the turntable 9. The centering is maintained during the entire playing operation. Moreover, the action of the centering device 17 ensures that the disc cannot come off the turntable 9.

What is claimed is:

1. A disc player for a rigid information-carrying disc which during the information transfer rotates about the axis of rotation of a turntable, which player has a centering device which comprises a plurality of centering elements which are arranged along a circle, which are connected to a common base ring, and which are each resilient in a radial direction so that the centering elements, which act on the center hole of the disc, keep the disc in a centered position relative to the axis of rotation during its rotation, which player further comprises a lid which as it is closed urges the disc resiliently onto the centering device and against the turntable by means of a disc loader, characterized in that the centering elements comprise U-shaped members which extend radially outwards from the base ring, their inner limbs being connected to the base ring and projections on the outer limbs engaging an annular recess in the turntable so that the limbs are radially movable in said recess, the base ring is provided with a collar which surrounds a flanged sleeve with clearance, which flanged sleeve is connected to the turntable, the position of the base ring being fixed by a clamping sleeve which is slid onto the flanged sleeve, so that the collar is clamped between the clamping sleeve and the turntable, in the absence of an information-carrying disc, the outer limbs spring outwards against a stop ring which is provided on the turntable and which is concentric with the axis of rotation, and the inner wall of the center hole in the information-carrying disc has a diameter which is smaller than the stop ring.

2. A disc player as claimed in claim 1, characterized in that near the free ends the outer limbs comprise projections which engage an undercut portion, of the annular recess, which portion is disposed near the stop ring on the turntable.

3. A disc player as claimed in claim 2, characterized in that the upper walls of the base ring and of the projections on the outer limbs are disposed substantially in line with each other and the base ring is also disposed in the annular recess.

* * * * *

UNITED STATES PATENT AND TRADEMARK OFFICE
CERTIFICATE OF CORRECTION

PATENT NO.   :   4,484,321

DATED        :   November 20, 1984

INVENTOR(S)  :   KURT EISEMANN

It is certified that error appears in the above—identified patent and that said Letters Patent is hereby corrected as shown below:

In the Title Page:

After "[75] Inventors"  -  on next line insert

--[73] Assignee: U. S. Philips Corporation--

Signed and Sealed this

Eleventh Day of June 1985

[SEAL]

Attest:

DONALD J. QUIGG

Attesting Officer     Acting Commissioner of Patents and Trademarks